(12) United States Patent
Cui et al.

(10) Patent No.: US 12,345,518 B2
(45) Date of Patent: Jul. 1, 2025

(54) METHOD FOR MEASURING THICKNESS AND OPTICAL PROPERTIES OF MULTI-LAYER FILM

(71) Applicant: HUAQIAO UNIVERSITY, Fujian (CN)

(72) Inventors: Changcai Cui, Xiamen (CN); Ziqing Li, Xiamen (CN); Jing Lu, Xiamen (CN); Zhongwei Hu, Xiamen (CN); Xipeng Xu, Xiamen (CN); Hui Huang, Xiamen (CN); Guoqin Huang, Xiamen (CN)

(73) Assignee: Huaqiao University, Fujian (CN)

( * ) Notice: Subject to any disclaimer, the term of this patent is extended or adjusted under 35 U.S.C. 154(b) by 166 days.

(21) Appl. No.: 18/130,716

(22) Filed: Apr. 4, 2023

(65) Prior Publication Data
US 2023/0304788 A1 Sep. 28, 2023

Related U.S. Application Data

(63) Continuation of application No. PCT/CN2021/100838, filed on Jun. 18, 2021.

(30) Foreign Application Priority Data

Nov. 18, 2020 (CN) .......................... 202011296374.4

(51) Int. Cl.
*G01N 21/21* (2006.01)
*G01B 11/06* (2006.01)
(Continued)

(52) U.S. Cl.
CPC ............ *G01B 11/06* (2013.01); *G01N 21/211* (2013.01); *G01N 21/31* (2013.01); *G01B 15/025* (2013.01);
(Continued)

(58) Field of Classification Search
CPC .. G01B 11/06; G01B 15/025; G01B 11/0625; G01B 11/0641; G01N 21/211;
(Continued)

(56) References Cited

U.S. PATENT DOCUMENTS 6,795,636 B1 * 9/2004 Cronk ................... C23C 16/545
359/885
7,463,355 B1 12/2008 Zawaideh
10,024,783 B2 * 7/2018 Arieli ................. G01B 9/02091
356/491

FOREIGN PATENT DOCUMENTS

CN         1633765 A      6/2005
CN       101051022 A     10/2007
(Continued)

OTHER PUBLICATIONS

Booth, "Synthesis and Characterization of Multilayered Diamond Coatings for Biomedical Implants", May 2011, Materials, 4(5), pp. 857-868.*

(Continued)

*Primary Examiner* — Michelle M Iacoletti
*Assistant Examiner* — Judy Dao Tran
(74) *Attorney, Agent, or Firm* — Cooper Legal Group, LLC

(57) ABSTRACT

A method for measuring a thickness and optical constants of a multi-layer film comprises the following steps: 1: depositing films on a substrate to form a multi-layer film; 2: measuring an ellipsometric spectrum of the multi-layer film; 3: when the film layer of the multi-layer film is the diamond film, step 41 is executed; when the film layer of the multi-layer film is the diamond-like film, steps 42, 5, and 6 are executed; 41: obtaining optical constants and a thickness of the film layer of the multi-layer film; 42: selecting a spectral region defining a transparent section of the film layer of the multi-layer film, and obtaining optical constants (Continued)

and a thickness of the film layer of the multi-layer film; 5: adjusting an amplitude and a width of an oscillator model according to the ellipsometric spectrum; and 6: evaluating a difference between an experimental value and a fitted value.

10 Claims, 2 Drawing Sheets

(51) Int. Cl.
    *G01N 21/31*     (2006.01)
    *G01B 15/02*     (2006.01)
    *G01N 21/25*     (2006.01)
    *G01N 21/55*     (2014.01)
    *G01N 21/84*     (2006.01)

(52) U.S. Cl.
    CPC ............. *G01N 21/25* (2013.01); *G01N 21/55* (2013.01); *G01N 2021/558* (2013.01); *G01N 21/8422* (2013.01); *G01N 2223/318* (2013.01)

(58) Field of Classification Search
    CPC ........ G01N 21/31; G01N 21/25; G01N 21/55; G01N 21/8422; G01N 2021/558; G01N 2223/318; G01N 21/87; G01N 2021/213; G01N 2021/8438
    See application file for complete search history.

(56) References Cited

FOREIGN PATENT DOCUMENTS

| | | | | | |
|---|---|---|---|---|---|
| CN | 101081557 | A | 12/2007 | | |
| CN | 101957502 | A | 1/2011 | | |
| CN | 101972135 | A | 2/2011 | | |
| CN | 103787585 | A | 5/2014 | | |
| CN | 104458589 | A | 3/2015 | | |
| CN | 103787585 | B | * 1/2016 | ............. | C03C 17/22 |
| CN | 106706521 | A | 5/2017 | | |
| CN | 107462530 | A | 12/2017 | | |
| CN | 107504907 | A | * 12/2017 | ............. | G01B 11/06 |
| CN | 108089244 | A | 5/2018 | | |
| CN | 208140036 | U | 11/2018 | | |
| CN | 109001122 | A | 12/2018 | | |
| CN | 109141259 | A | 1/2019 | | |
| CN | 106706521 | B | * 8/2019 | ............. | G01N 21/25 |
| CN | 112361972 | A | 2/2021 | | |
| CN | 112361973 | A | 2/2021 | | |
| JP | 2004093436 | A | * 3/2004 | ......... | G01B 11/0641 |
| JP | 2004286468 | A | 10/2004 | | |
| JP | 2023546457 | A | 11/2023 | | |
| WO | 9961867 | A1 | 12/1999 | | |

OTHER PUBLICATIONS

Zhang, "Study on diamond-like carbon multilayer films for tribological application". (Aug. 2005), . Diamond and Related Materials, vol. 14, Issue 8 (pp. 1361-1367).*
Corresponding International Patent Application No. PCT/CN2021/100838, International Search Report, date mailed Sep. 15, 2021.
Corresponding International Patent Application No. PCT/CN2021/100838, Written Opinion, date mailed Sep. 15, 2021.
Corresponding Chinese Patent Application No. 202011296374.4, First Office Action dated Dec. 3, 2021.
Corresponding Chinese Patent Application No. 202011296374.4, Second Office Action dated Aug. 2, 2022.
Corresponding Chinese Patent Application No. 202011296374.4, Notification to Grant Patent dated Sep. 5, 30 2022.
JP Office Action cited in JP2023-524480, mailed Jan. 5, 2024, 8 pages.
JP Decision to Grant cited in JP2023-524480, mailed May 31, 2024, 5 pages.

* cited by examiner

METHOD FOR MEASURING THICKNESS AND OPTICAL PROPERTIES OF MULTI-LAYER FILM

RELATED APPLICATIONS

This application is a continuation of International patent application PCT/CN2021/100838, filed on Jun. 18 2021, which claims priority to Chinese patent application 202011296374.4, filed Nov. 18, 2020. International patent application PCT/CN2021/100838 and Chinese patent application 202011296374.4 are incorporated herein by reference.

FIELD OF THE DISCLOSURE

The present disclosure relates to the field of optical measurement, and in particular relates to a method for measuring a thickness and optical properties of a multi-layer film.

BACKGROUND OF THE DISCLOSURE

Diamond-like films have good optical transmittance (infrared medium wave 3-5 μm, infrared long wave 8-12 μm), corrosion resistance, and other characteristics. A refractive index of the diamond-like films is adjustable from 2 to 3, and the diamond-like films are excellent infrared transmission-increasing films. However, the diamond-like films are prone to generate extremely high internal stress in a film formation process, which will limit a thickness, a service life, and a performance of a deposition in the film formation process. Diamond films are widely used in optical devices, such as infrared windows. The diamond films have high mechanical strength, high thermal conductivity, good wear resistance, good corrosion resistance, and high infrared transmittance, so the optical devices have a powerful protective function against extremely harsh environments, such as friction or wind-blown sand. Therefore, the multi-layer film comprising the diamond-like film and the diamond film are film materials with excellent properties, such as matching refractive index, high transmittance, high hardness, etc.

The multi-layer film comprising the diamond-like film and the diamond film has a multi-layer structure, and requirements for a thickness and a surface roughness of the multi-layer film are different according to different applications. An increase of a number of layers of the multi-layer film and a roughness of each layer of the multi-layer film will directly affect a transmittance of an entirety of the multi-layer film, thus affecting a use of the optical devices. During a growth process of each layer of the multi-layer film, the refractive index of each layer is greatly affected by conditions for a preparation process of the multi-layer film, thus inevitably leading to defects or non-uniformity. Effective testing of the refractive index of each layer can prevent a refractive index deviation of film layers of the multi-layer film caused by a deviation of the preparation process, thus ensuring an optical performance of the optical devices.

The existing measurement system for the multi-layer film mostly focuses on a test of a thickness of the multi-layer film. Chinese patent application CN208140036U discloses an online thickness measurement system for the multi-layer film. A thickness of an opaque substrate is measured by a laser triangulation method, and a thickness of a transparent coating is measured by infrared light. Measurement sections of two modules for the laser triangulation method and the infrared light are limited to a same location. The existing measurement system can be used to achieve parameters of a thickness of a same section of the multi-layer film with high-precision using online measurement, but a measurement of surface roughness and optical properties of the multi-layer film is not involved.

BRIEF SUMMARY OF THE DISCLOSURE

The present disclosure provides a method for measuring a thickness and optical properties of a multi-layer film to overcome the deficiencies of the existing system for measuring a thickness of the multi-layer film in the background.

In order to solve the aforementioned technical problem, a technical solution of the present disclosure is as follows:

A method for measuring a thickness and optical constants of a multi-layer film, comprising:
  step 1: depositing film layers on a substrate to form a multi-layer film in sequence, wherein the film layers of the multi-layer film are classified into a diamond-like film and a diamond film;
  step 2: measuring an ellipsometric spectrum of the multi-layer film;
  step 3: judging whether each film layer of the multi-layer film is the diamond film or the diamond-like film; when the film layer of the multi-layer film is the diamond film, step 41 is executed; when the film layer of the multi-layer film is the diamond-like film, steps 42, 5, and 6 are executed;
  step 41: obtaining optical constants and a thickness of the film layer of the multi-layer film by calculating using Cauchy model in a full spectral region;
  step 42: selecting a spectral region defining a transparent section of the film layer of the multi-layer film, and obtaining optical constants and a thickness of the film layer of the multi-layer film by calculating using Cauchy model in the spectral region;
  step 5: adding an oscillator model for dielectric constants to an absorption spectrum region of the diamond-like film, and adjusting an amplitude and a width of the oscillator model according to the ellipsometric spectrum; and
  step 6: evaluating a difference between an experimental value and a fitted value by using an evaluation function mean squared error (MSE) to determine a structure of the multi-layer film and optical constants and a thickness of each film layer of the multi-layer film;
  wherein the optical constants comprise refractive index and extinction coefficient.

In an embodiment, in the step 42, a calculation formula of the Cauchy model is:

$$n = An + \frac{Bn}{\lambda^2} + \frac{Cn}{\lambda^4}, \quad (1)$$

$$k(\lambda) = A_k e^{B_k(E-E_b)} \quad (2),$$

An, Bn, and Cn are parameters of the Cauchy model, λ is wavelength, the extinction coefficient k is described by three parameters $A_k$, $B_k$, and $E_b$, $E_b = 1240/\lambda_b$, and $E_b$ relates to a material of the substrate.

In an embodiment, in the step 5, the oscillator model for the dielectric constants is a Lorentz oscillator, and a calculation formula of the Lorentz oscillator is:

$$n = \frac{AE_n}{E_n^2 - E^2 - iBrE},\quad(3)$$

A is an amplitude of parameters of the oscillator model, $E_n$ is a center position of the parameters of the oscillator model, and Br is a half wave width of the parameters of the oscillator model.

In an embodiment, in step 6, a calculation formula of the evaluation function MSE is:

$$MSE^2 = \frac{1}{2N-M}\sum_{i=1}^{n}\left[\left(\frac{\psi_i^{mod}-\psi_i^{exp}}{\delta_{\psi,i}^{exp}}\right)^2 + \left(\frac{\Delta_i^{mod}-\Delta_i^{exp}}{\delta_{\Delta,i}^{exp}}\right)^2\right]\quad(4)$$

mod is a fitted value, exp is a measured value, δ is a measurement error, N is a total logarithm of ψ and Δ measured by ellipsometer at a same time, and M is a logarithm of a selected fitted parameter.

In an embodiment, a bottom layer of the multi-layer film is a base, the base is the diamond-like film or the diamond film, a top layer of the multi-layer film is the diamond film, one or more layers between the bottom layer and the top layer are one or more intermediate layers, the one or more intermediate layers comprise the diamond-like film or a film with adjustable refractive index, and the film with the adjustable refractive index is different from the diamond film and the diamond-like film.

In an embodiment, the multi-layer film comprises at least three layers.

In an embodiment, in the step 3, judging whether the each film layer of the multi-layer film is the diamond film or the diamond-like film comprises judging whether the film layer of the multi-layer film is the diamond film or the diamond-like film according to characteristics of a material of the film layer of the multi-layer film.

In an embodiment, the substrate is a diamond substrate, a Si substrate, or a Ge substrate.

In an embodiment, the multi-layer film is an infrared window, a detector, or a protective film for glass.

Compared with the background of the present disclosure, the technical solution has the following advantages.

The ellipsometric spectrum of the multi-layer film is firstly measured, the appropriate optical model is then selected according to the diamond film and diamond-like film to be fitted, and the thickness and the optical properties of each film layer of the multi-layer film and a whole structure of the multi-layer film are finally obtained by combining mean squared error (MSE) fitted results. The method is not limited to use with a diamond substrate, but the method can also be used with all substrates with coating requirements. The multi-layer film comprising the diamond-like film and/or the diamond film can be used as an infrared window, a detector, protective films for glass, etc. The refractive index can be adjusted to increase light transmittance as required.

REFERENCE NUMBERS IN THE DRAWINGS

Figure 1:
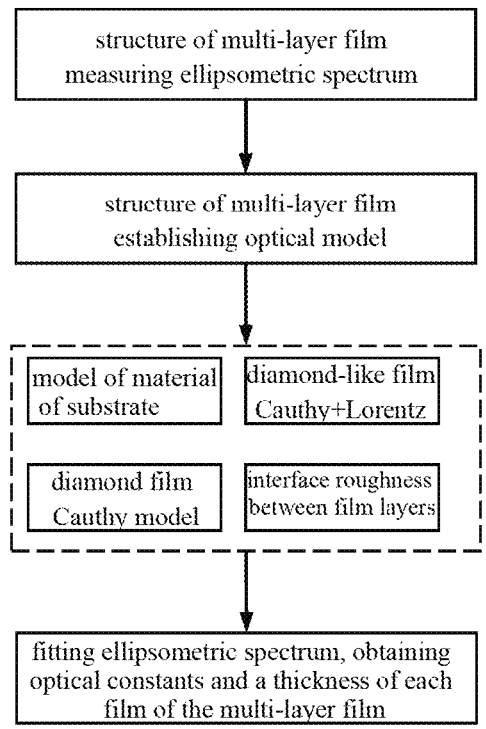
FIG. 1 is a flow chart of a measurement method of an embodiment.

Broad-spectrum light source 11, collimating lens 12, polarizer 13, first compensator 14, a sample 15 of the multi-layer layer to be tested, collimating lens group 16, second compensator 17, analyzer 18, and detector 19.

DETAILED DESCRIPTION OF THE EMBODIMENTS

In order to explain the objective, the technical solution, and the features of the present disclosure, a method for measuring a thickness and optical properties of a multi-layer film will be further described below in combination with the accompanying embodiments and drawings.

Figure 3:
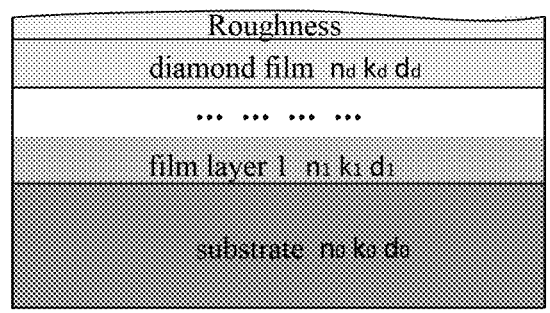
FIG. 3 is a structural view of a multi-layer film measured in the embodiment.

The method for measuring the thickness and the optical properties of the multi-layer film comprises:

Step 1. Films are deposited on a substrate to form a multi-layer film in sequence, and films of the multi-layer film are classified into diamond-like films and diamond films. The substrate is a diamond substrate, a Si substrate (e.g., a Si glass), or a Ge substrate (e.g., a Ge glass), but other substrates can be selected as required. The multi-layer film has at least three layers, as shown in FIG. 3. A bottom layer of the multi-layer film is a base, and the base is a diamond-like film or a diamond film. A top layer of the multi-layer film is the diamond film and functions as a protective layer, and one or more layers between the bottom layer and the top layer are one or more intermediate layers. The one or more intermediate layers comprise a diamond-like film or a film with an adjustable refractive index, and the film with the adjustable refractive index is different from the diamond film and the diamond-like film;

Step 2. Ellipsometric spectrum of the multi-layer film is measured;

Step 3. Whether each film layer of the multi-layer film is the diamond film or the diamond-like film is judged according to characteristics of a material of the multi-layer film. When the film layer of the multi-layer film is the diamond film, step 41 is executed; when the film layer of the multi-layer film is the diamond-like film, steps 42, 5, and 6 are executed. Whether the film layer of the multi-layer film is the diamond film or the diamond-like film is judged to select an appropriate optical model, that is, the optical model is established. A composition ($sp^2$, $sp^3$, etc.) of the material of the diamond film or the diamond-like film is different, resulting in an absorption difference (one of the characteristics of the material). The film layer of the multi-layer film is judged by the absorption difference in combination with the ellipsometric spectrum;

Step 41. Optical constants and a thickness of the film layer of the multi-layer film are determined by calculation using Cauchy model in a full spectral region;

Step 42. A spectral region defining a transparent section of the film layer of the multi-layer film is selected, and the optical constants and the thickness of the film layer of the multi-layer film are calculated using Cauchy model in the spectral region;

Step 5. An oscillator model for dielectric constants is added to an absorption spectrum region of the diamond-like film, and an amplitude and a width of the oscillator model is adjusted according to the ellipsometric spectrum; and Step 6. A difference between an experimental value and a fitted value is evaluated using an evaluation function mean squared error (MSE) to determine a structure of the multi-layer film and the optical constants and the thickness of each film layer of the multi-layer film.

The optical constants comprise refractive index n and extinction coefficient k. A fitted effect is better when the evaluation function MSE is smaller.

In Step 42, a calculation formula of the Cauchy model is as follows:

$$n = An + \frac{Bn}{\lambda^2} + \frac{Cn}{\lambda^4}, \qquad (1)$$

$$k(\lambda) = A_k e^{B_k(E-E_b)} \qquad (2),$$

wherein An, Bn, and Cn are parameters of the Cauchy model, $\lambda$ is wavelength, the extinction coefficient k is described by three parameters $A_k$, $B_k$, and $E_b$, $E_b = 1240/\lambda_b$, and $E_b$ relates to a material of the substrate.

In Step 5, the oscillator model for the dielectric constants is the Lorentz oscillator, and a calculation formula of the Lorentz oscillator is as follows:

$$n = \frac{AE_n}{E_n^2 - E^2 - iBrE}, \qquad (3)$$

wherein A is an amplitude of parameters of the oscillator model, $E_n$ is a center position of the parameters of the oscillator model, and Br is a half wave width of the parameters of the oscillator model.

In Step 6, a calculation formula of the evaluation function MSE is as follows:

$$MSE^2 = \frac{1}{2N-M} \sum_{i=1}^{n} \left[ \left( \frac{\psi_i^{mod} - \psi_i^{exp}}{\delta_{\psi,i}^{exp}} \right)^2 + \left( \frac{\Delta_i^{mod} - \Delta_i^{exp}}{\delta_{\Delta,i}^{exp}} \right)^2 \right], \qquad (4)$$

wherein mod is the fitted value, exp is a measured value, $\delta$ is a measurement error, N is a total logarithm of $\psi$ and $\Delta$ measured by an ellipsometer at a same time, and M is a logarithm of a selected fitted parameter.

The multi-layer film of the embodiment can be used as an infrared window, a detector, a protective film for glass, etc., and the refractive index of the multi-layer film can be adjusted to increase light transmittance as required.

Figure 2:
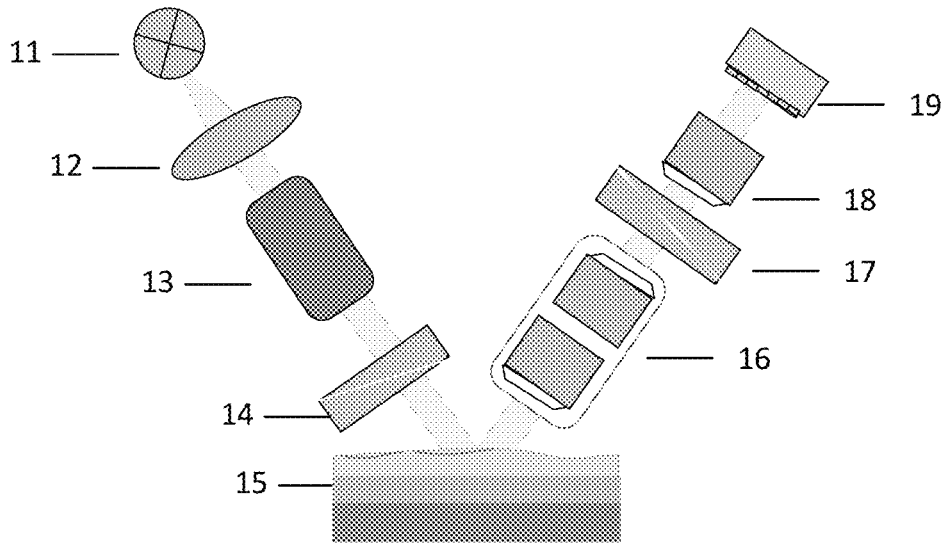
FIG. 2 is a schematic view of a measurement system in the embodiment.

The ellipsometric spectrum of the multi-layer film is measured by a test system. Referring to FIG. 2, the test system comprises a broad-spectrum ellipsometer. The broad-spectrum ellipsometer comprises a broad-spectrum light source 11, a collimating lens 12, a polarizer 13, a first compensator 14, a sample 15 of the multi-layer film to be tested, a collimating lens group 16, a second compensator 17, an analyzer 18, and a detector 19. Light emitted from the broad-spectrum light source 11 irradiates the sample 15 of the multi-layer film to be tested through the collimating lens 12, the polarizer 13, and the first compensator 14. After the light is reflected, the light is transmitted to the detector 19 through the collimating lens group 16, the second compensator 17, and the analyzer 18. A spectral range of the broad-spectrum ellipsometer covers ultraviolet light, visible light, and near-infrared light.

The aforementioned embodiments are merely some embodiments of the present disclosure, and the scope of the disclosure is not limited thereto. Thus, it is intended that the present disclosure cover any non-substantive modifications of the presently presented embodiments provided they are made without departing from the appended claims and the specification of the present disclosure by person skilled in the art.

What is claimed is:

1. A method for measuring a thickness and optical properties of a multi-layer film, comprising:
    step 1: depositing films on a substrate to form a multi-layer film in sequence, wherein the films of the multi-layer film are classified into a diamond-like film and a diamond film;
    step 2: measuring an ellipsometric spectrum of the multi-layer film;
    step 3: judging whether each film layer of the multi-layer film is the diamond film or the diamond-like film; when the film layer of the multi-layer film is the diamond film, step 41 is executed; when the film layer of the multi-layer film is the diamond-like film, steps 42, 5, and 6 are executed;
    step 41: obtaining optical constants and a thickness of the film layer of the multi-layer film by calculating using Cauchy model in a full spectral region;
    step 42: selecting a spectral region defining a transparent section of the film layer of the multi-layer film, and obtaining optical constants and a thickness of the film layer of the multi-layer film by calculating using Cauchy model in the spectral region;
    step 5: adding an oscillator model for dielectric constants to an absorption spectrum region of the diamond-like film, and adjusting an amplitude and a width of the oscillator model according to the ellipsometric spectrum; and
    step 6: evaluating a difference between an experimental value and a fitted value by using an evaluation function mean squared error (MSE) to determine a structure of the multi-layer film and optical constants and a thickness of each film layer of the multi-layer film,
    wherein the optical constants comprise refractive index n and extinction coefficient k.

2. The method according to claim 1, wherein:
    in the step 42, a calculation formula of the Cauchy model is:

$$n = An + \frac{Bn}{\lambda^2} + \frac{Cn}{\lambda^4}, \qquad (1)$$

$$k(\lambda) = A_k e^{B_k(E-E_b)} \qquad (2),$$

An, Bn, and Cn are parameters of the Cauchy model, $\lambda$ is wavelength, the extinction coefficient k is described by three parameters $A_k$, $B_k$ and $E_b$, $E_b = 1240/\lambda_b$, and $E_b$ relates to a material of the substrate.

3. The method according to claim 1, wherein:
    in the step 5, the oscillator model for the dielectric constants is a Lorentz oscillator, and a calculation formula of the Lorentz oscillator is:

$$n = \frac{AE_n}{E_n^2 - E^2 - iBrE}, \qquad (3)$$

A is an amplitude of parameters of the oscillator model, $E_n$ is a center position of the parameters of the oscillator model, and Br is a half wave width of the parameters of the oscillator model.

4. The method according to claim 1, wherein:
in step 6, a calculation formula of the evaluation function MSE is:

$$MSE^2 = \frac{1}{2N-M}\sum_{i=1}^{n}\left[\left(\frac{\psi_i^{mod}-\psi_i^{exp}}{\delta_{\psi,i}^{exp}}\right)^2 + \left(\frac{\Delta_i^{mod}-\Delta_i^{exp}}{\delta_{\Delta,i}^{exp}}\right)^2\right], \quad (4)$$

mod is a fitted value, exp is a measured value, δ is a measurement error, N is a total logarithm of ψ and Δ measured by an ellipsometer at a same time, and M is a logarithm of a selected fitted parameter.

5. The method according to claim 1, wherein:
a bottom layer of the multi-layer film is a base,
the base is the diamond-like film or the diamond film,
a top layer of the multi-layer film is the diamond film,
one or more layers between the bottom layer and the top layer are one or more intermediate layers,
the one or more intermediate layers comprise the diamond-like film or a film with adjustable refractive index, and
the film with the adjustable refractive index is different from the diamond film and the diamond-like film.

6. The method according to claim 1, wherein the multi-layer film comprises at least three layers.

7. The method according to claim 1, wherein:
in the step 3, judging whether each film layer of the multi-layer film is the diamond film or the diamond-like film comprises judging whether the film layer of the multi-layer film is the diamond film or the diamond-like film according to characteristics of a material of the film layer of the multi-layer film.

8. The method according to claim 1, wherein the substrate is a diamond substrate, a Si substrate, or a Ge substrate.

9. The method according to claim 1, wherein the multi-layer film is an infrared window, a detector, or a protective film for glass.

10. The method according to claim 1, wherein:
the measuring an ellipsometric spectrum of the multi-layer film comprises measuring the ellipsometric spectrum of the multi-layer film using a broad-spectrum ellipsometer,
the broad-spectrum ellipsometer comprises a broad-spectrum light source, a collimating lens, a polarizer, a first compensator, a sample of the multi-layer film to be tested, a collimating lens group, a second compensator, an analyzer, and a detector,
light emitted from the broad-spectrum light source irradiates the sample of the multi-layer film to be tested through the collimating lens, the polarizer, and the first compensator, and
after the light is reflected, the light is transmitted to the detector through the collimating lens group, the second compensator, and the analyzer.

* * * * *